（12）United States Patent
Grbovic

(10) Patent No.: US 8,379,424 B2
(45) Date of Patent: Feb. 19, 2013

(54) METHOD AND SYSTEM FOR MANAGING THE TEMPERATURE IN A SPEED CONTROLLER

(75) Inventor: Petar Grbovic, Vernon (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 1334 days.

(21) Appl. No.: 12/101,609

(22) Filed: Apr. 11, 2008

(65) Prior Publication Data

US 2008/0251589 A1 Oct. 16, 2008

(30) Foreign Application Priority Data

Apr. 12, 2007 (FR) .................................... 07 54400

(51) Int. Cl.
*H02M 1/10* (2006.01)
(52) U.S. Cl. ...................................... 363/141; 702/181
(58) Field of Classification Search .................. 363/141; 702/182
See application file for complete search history.

(56) References Cited

U.S. PATENT DOCUMENTS

| | | | |
|---|---|---|---|
| 5,923,135 A | 7/1999 | Takeda | |
| 6,215,681 B1 | 4/2001 | Schuurman et al. | |
| 6,654,260 B2 * | 11/2003 | Okayama et al. | 363/37 |
| 7,356,441 B2 * | 4/2008 | Kerkman et al. | 702/182 |

FOREIGN PATENT DOCUMENTS

JP 2006-254574 9/2006

OTHER PUBLICATIONS

Biswajit Ray, "High-Reliability Space Power Converters: Design and Analysis Issues", 37$^{TH}$ Intersociety Energy Conversion Engineering Conference (IECEC), Washington DC, 2002, Paper No. 20035, Jul. 29-31, 2002, Proceedings of the Intersociety Energy Conversion Engineering Conference, New York, ISBN: 0-7803-7296-4, pp. 242-247.

Gary L. Skibinski, et al., "Thermal Parameter Estimation Using Recursive Identification", Conference Record of the Industry Applications Society Annual Meeting, Seattle, Oct. 7-12, 1990, New York, IEEE, vol. 2, Meeting 25, ISBN: 0-87942-553-9, pp. 1581-1588.

* cited by examiner

*Primary Examiner* — Jessica Han
(74) *Attorney, Agent, or Firm* — Oblon, Spivak, McClelland, Maier & Neustadt, L.L.P.

(57) ABSTRACT

A method for managing the temperature implemented in a speed controller that includes several modules, each including a case containing a power semiconductor that provides a pulsed voltage to an electrical load, each module being characterized by a junction temperature, a heat sink, and a temperature sensor mounted on the heat sink. The method for a module includes estimating a case temperature based on a predetermined thermal model of the sink, a temperature measured by the sensor and average power losses that the module undergoes, the predetermined thermal model of the sink integrating the thermal transfer impedances representing the thermal influence of one module on another and vice versa; determining a junction-case temperature based on the case temperature of the module and a limiting value of the junction temperature; and limiting the junction-case temperature obtained to a predetermined limiting value of the junction-case temperature.

7 Claims, 3 Drawing Sheets

METHOD AND SYSTEM FOR MANAGING THE TEMPERATURE IN A SPEED CONTROLLER

BACKGROUND (1) Field

The present invention relates to a method for managing the temperature implemented in a speed controller. The invention also relates to a system for managing the temperature in a speed controller.

(2) Description of the Related Art

A speed controller comprises several semiconductor power modules controlled in order to supply a pulsed voltage to an electrical load. Each semiconductor power module is, for example, composed of a case containing two IGBT transistors (Isolated Gate Bipolar Transistor), each connected to a freewheeling diode (FWD). A semiconductor component of the IGBT transistor type is characterized in particular by its junction temperature and its junction-case temperature. A heat sink is mounted on the modules so as to dissipate the heat given off by the modules when operating.

The IGBT transistors used in the semiconductor power modules are the most important and the most expensive components used in a speed controller. It is therefore necessary to protect them. To do this, their absolute junction temperature must not exceed a limiting value specified by the manufacturer and their junction-case temperature must also be kept below a limiting value. For example, if the semiconductor component is made of silicon, the limiting value of the absolute junction temperature is 150° C. and the limiting value of the junction-case temperature is 65° C. If one of the limiting values is exceeded, the semiconductor component deteriorates, which might lead to important dysfunctioning in the speed controller.

As the semiconductor power modules are integrated in increasingly compact controllers, their thermal dissipation becomes increasingly difficult and the margin between the normal operating temperatures of the semiconductor components and the limiting values is increasingly restricted. Consequently, it is necessary to implement in the controller a method for managing the temperature of semiconductor components.

To do this, several possibilities exist, depending on whether the controller comprises one or several temperature sensors. In fact, when the power semiconductors are divided into three distinct modules, each comprising two IGBT transistors and two freewheeling diodes, the temperature management is not the same as when one temperature sensor per module or a single sensor for all the modules is used. In the first case, if the temperature sensor is mounted directly under the module case, the temperature measured is that of the module case and can be dealt with directly. Conversely, in the second case, if there is a single temperature sensor located, for example, on the heat sink a certain distance from the modules, the temperature which will be measured there will not agree with the case temperature of the modules. In this latter case, with a view to carrying out the appropriate management, it is often necessary to proceed to estimations in order to know the temperature of the semiconductor components.

Methods of managing the temperature of the semiconductor modules of a speed controller have already been proposed in the prior art.

Document EP 0792008 describes a method and a device for protecting the semiconductor power modules of a controller. The method consists in calculating the thermal losses of the semiconductor components and the increase in junction-case temperature. If the increase in temperature is greater than a predetermined limiting value, the operating cycle of the semiconductor modules is adjusted so as to reduce the output current of the controller.

Document JP 2005143232 also describes a method for managing the temperature of semiconductor power modules in a speed controller. This method consists in controlling the flow of current through the controller as a function of the junction temperature of the semiconductor components.

Document U.S. Pat. No. 5,923,135 describes a control device for an electric motor comprising a control circuit equipped with several semiconductor modules. This device furthermore comprises means for estimating the junction temperature of the components of each module based on a measured temperature, means for comparing the junction temperature obtained with a limiting value and means for adjusting the output of the control circuit with a view to regulating the junction temperature at a value lower than or equal to the permitted limiting value. In particular, this document proposes a thermal model for each module. This thermal model does not, however, take account of the environment of each module and in particular of the influence of the other modules on the temperature of the module attended to.

BRIEF SUMMARY

The aim of the invention is to propose a method and a system for managing the temperature of semiconductor power modules of a speed controller equipped with a single temperature sensor.

This aim is achieved by a method for managing the temperature implemented in a speed controller, said speed controller comprising:
- one or several modules, each comprising a case containing a power semiconductor designed to provide a pulsed voltage to an electrical load, each module being characterized by a junction temperature;
- a heat sink to dissipate the heat generated by each module;
- a temperature sensor mounted on the heat sink; said method being characterized in that for each module it consists in:
- estimating a case temperature of the module based on a predetermined thermal model of the sink, a temperature measured by the sensor and average power losses that the module undergoes, said predetermined thermal model of the sink integrating the thermal transfer impedances representing the thermal influence of one module on another and vice versa;
- determining a junction-case temperature based on the case temperature of the module and a limiting value of the junction temperature; and
- limiting the junction-case temperature obtained to a predetermined limiting value of the junction-case temperature.

According to the invention, the thermal model of the sink is defined by the following equation:

$$\begin{bmatrix} T_{C\_U}(s) \\ T_{C\_V}(s) \\ T_{C\_W}(s) \end{bmatrix} = \underbrace{\begin{bmatrix} Z_{UU}(s) & Z_{VU}(s) & Z_{WU}(s) \\ Z_{UV}(s) & Z_{VV}(s) & Z_{WV}(s) \\ Z_{UW}(s) & Z_{VW}(s) & Z_{WW}(s) \end{bmatrix}}_{Z_{jk}(s)} \cdot \begin{bmatrix} P_U(s) \\ P_V(s) \\ P_W(s) \end{bmatrix} + \begin{bmatrix} 1 \\ 1 \\ 1 \end{bmatrix} \cdot T_{SN}$$

in which:
- $T_{C\_U}$, $T_{C\_V}$ and $T_{C\_W}$ represent the case temperatures of each module placed at the phases U, V and W respectively;
- $Z_{UU}$, $Z_{VV}$ and $Z_{WW}$ correspond to the increase in temperature due to the ringing effect and to the non-ideal thermal contact existing between the module case and the heat sink;
- $Z_{VU}$, $Z_{WU}$, $Z_{UV}$, $Z_{WV}$, $Z_{UW}$ and $Z_{VW}$ are the thermal transfer impedances representing the thermal influence of one module on another and vice versa; and
- $T_{SN}$ is the temperature measured by the temperature sensor.

According to a distinctive feature, the variables of the thermal model are determined in advance by independently injecting power in each of the phases and by measuring the effect on temperature produced on the module in each phase.

According to another distinctive feature, the method consists in limiting the junction-case temperature obtained for the module to a predetermined limiting value of the junction-case temperature while taking account of the module positioned in the controller in the thermally least advantageous situation.

According to another distinctive feature, the case temperature of the module is estimated based on the angular frequency of control applied to the load.

According to another distinctive feature, the average power losses are calculated based on the load current, the switching frequency of the transistors in the module, the voltage measured on the DC bus of the controller and parameters specific to the module.

The invention also relates to a system for managing the temperature in a speed controller comprising processing means connected with a memory and means for controlling the modules of the controller in order to regulate the temperature and implement the method defined above.

BRIEF DESCRIPTION OF THE DRAWINGS

Other features and advantages will appear in the detailed description that follows, referring to an embodiment given by way of example and represented by the appended drawings in which.

DETAILED DESCRIPTION

Figure 1:
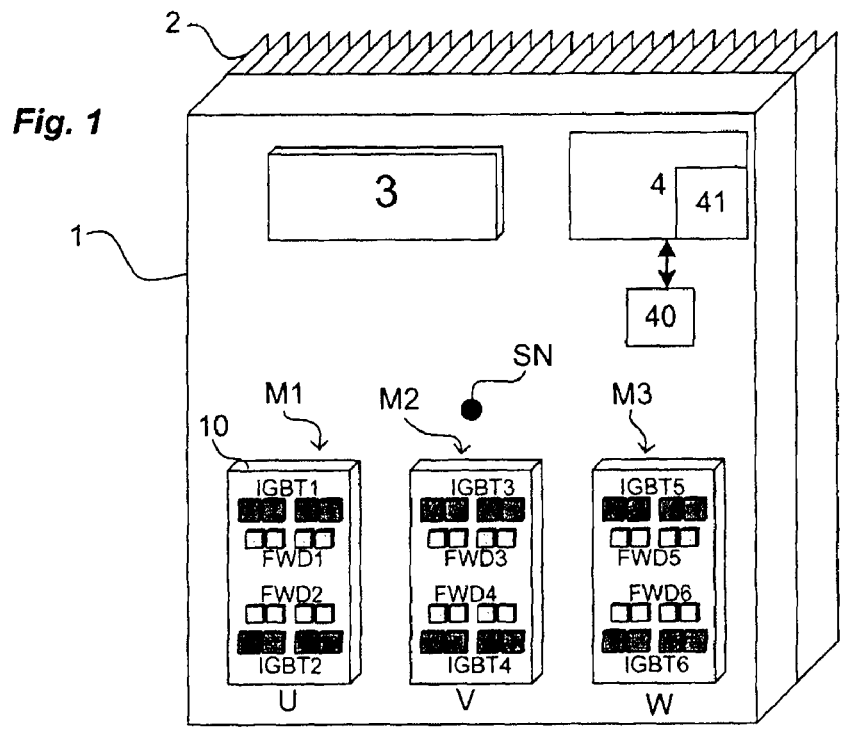
FIG. 1 schematically represents a speed controller as used in the invention.

With reference to FIG. 1, a speed controller 1 comprises a casing containing, for example, three semiconductor power modules M1, M2 and M3, each equipped with two IGBT transistors (IGBT1 to IGBT6) and two antiparallel diodes (FWD1 to FWD6), also called freewheeling diodes. On the casing the controller 1 comprises at the rear a heat sink 2 allowing the heat generated by the modules when operating to be dissipated. The controller 1 furthermore comprises an input rectifier 3 to supply the modules M1, M2 and M3 with direct current and hence to produce a pulsed voltage to an electrical load connected to the controller 1.

In the controller 1, the modules M1, M2 and M3 are, for example, situated opposite the lower part of the sink 2 while the input rectifier is located opposite the upper part of the sink 2. A temperature sensor SN is, for example, located at the level of the centre of the heat sink 2.

Conventionally, a module M1 has the form of a plastic case equipped with a base plate or metal base 10, for example made of copper. The semiconductor components rest on a ceramic substrate responsible for electrical insulation from the base 10, this base being in contact with the sink 2. The module is, for example, attached to the sink by means of screws.

The invention consists in implementing a method for managing the temperature at the core of the controller in order to protect the semiconductor power components. This method is implemented thanks to a system integrated into the controller 1 comprising processing means 4 connected with at least a memory 40 and able to act on the means for controlling the modules in order to effect the temperature regulation. These processing means 4 comprise in particular calculation means 41 for implementing the method described above.

Figure 2:
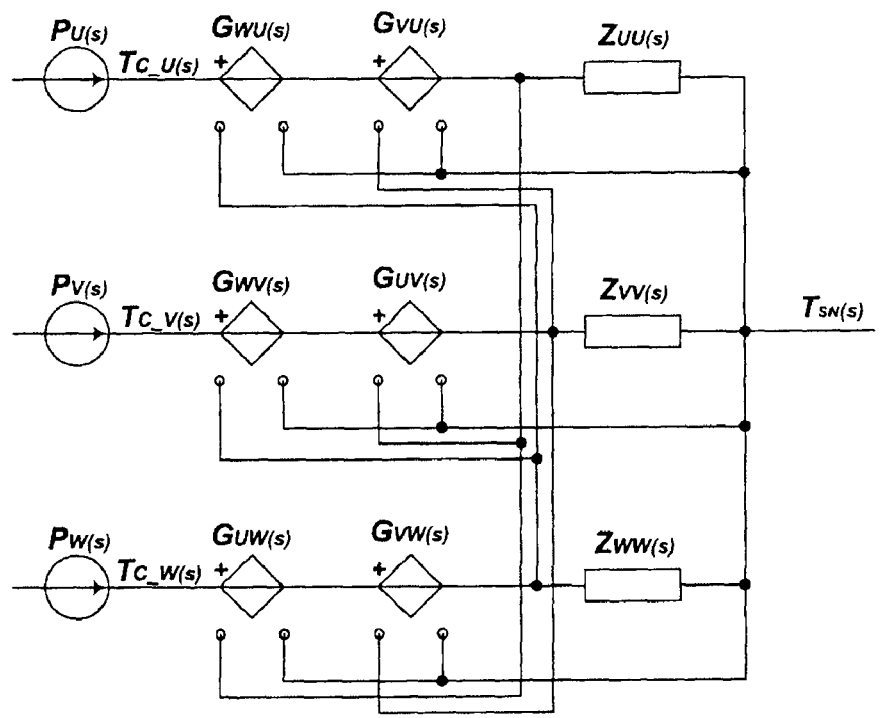
FIG. 2 represents the thermal model of the sink used in the method and the system of the invention.

To implement this method, the system stores a predefined thermal model of the heat sink. This model, shown in FIG. 2, is constructed by considering the relation between the thermal properties and the electrical properties in the core of the controller.

This thermal model comprises the three energy sources $P_U(S)$, $P_V(S)$ and $P_U(S)$ providing each of the phases U, V and W with current. The flow of a current in each module M1, M2 and M3 leads to losses causing an increase in the case temperatures $T_{C\_U}$, $T_{C\_V}$ and $T_{C\_W}$ of each module. $G_{VU}$, $G_{WU}$, $G_{UV}$, $G_{WV}$, $G_{UW}$ and $G_{VW}$ represent the reciprocal thermal influences between the modules. $Z_{UU}$, $Z_{VV}$ and $Z_{WW}$ represent the self-impedances due to the increase in temperature generated by the ringing effect and to the non-ideal thermal contact between the case of each module and the heat sink. The ringing effect represents the thermal dispersion impedance of the heat sink, and more precisely the temperature gradient between the case of a module and the sink.

This thermal model can also be defined by the following equation:

$$\begin{bmatrix} T_{C\_U}(s) \\ T_{C\_V}(s) \\ T_{C\_W}(s) \end{bmatrix} = \underbrace{\begin{bmatrix} Z_{UU}(s) & Z_{VU}(s) & Z_{WU}(s) \\ Z_{UV}(s) & Z_{VV}(s) & Z_{WV}(s) \\ Z_{UW}(s) & Z_{VW}(s) & Z_{WW}(s) \end{bmatrix}}_{Z_{jk}(s)} \cdot \begin{bmatrix} P_U(s) \\ P_V(s) \\ P_W(s) \end{bmatrix} + \begin{bmatrix} 1 \\ 1 \\ 1 \end{bmatrix} \cdot T_{SN} \quad (1)$$

in which:
- $T_{C\_U}$, $T_{C\_V}$ and $T_{C\_W}$ represent the case temperatures of each module M1, M2 and M3 placed at the phases U, V and W respectively;
- $Z_{UU}$, $Z_{VV}$ and $Z_{WW}$ are the self-inductances of the modules corresponding to the ringing effect and to the non-ideal thermal contact existing between the module case and the heat sink; and
- $Z_{VU}$, $Z_{WU}$, $Z_{UV}$, $Z_{WV}$, $Z_{UW}$ and $Z_{VW}$ are the thermal transfer impedances representing the thermal influence of one module on another and vice versa.

More precisely, the thermal transfer impedances $Z_{VU}$, $Z_{WU}$, $Z_{UV}$, $Z_{WV}$, $Z_{UW}$ and $Z_{VW}$ are defined by the following equations:

$$Z_{VU}(s)=Z_{VV}(s)G_{VU}(s); Z_{WU}(s)=Z_{WW}(s)G_{WU}(s); Z_{UV}(s)=Z_{UU}(s)G_{UV}(s);$$

$$Z_{WV}(s)=Z_{WW}(s)G_{WV}(s), Z_{UW}(s)=Z_{UU}(s)G_{UW}(s);$$
$$Z_{VW}(s)=Z_{WW}(s)G_{VW}(s) \quad (2)$$

in which $G_{VU}$, $G_{WU}$, $G_{UV}$, $G_{WV}$, $G_{UW}$ and $Z_{VW}$ represent the thermal influences of one module on another.

In order to determine the values of the thermal model of the heat sink, a series of experiments is carried out during the design of the controller.

The thermal model is not symmetrical as the case temperature of a module located on the side of the sink (the case of the modules M1, M3 in phases U, W) is certainly higher than that of a module situated at the centre of the sink where thermal exchanges are easier. Starting from here, and for reasons of simplicity, the system for managing the temperature of the invention is not implemented only for a single module. To do this, the system takes into account the least advantageous case and calculates the case temperature of a module situated at the side relative to the sink. It is concerned, for example, with the module M1 in the phase U.

The values of self-impedance $Z_{UU}$ and of the thermal transfer impedances $Z_{VU}$, $Z_{WU}$ for the module M1 in the phase U are therefore determined in the way detailed below.

Based on the thermal model defined above, the case temperature $T_{C\_U}$ of the module M1 situated in the phase U is obtained by the following equation:

$$T_{C\_U}(s)=P_U(s)Z_{UU}(s)+P_V(s)Z_{VU}(s)+P_W(s)Z_{WU}(s)+T_{SN}. \quad (3)$$

in which:

$P_U$, $P_V$ and $P_W$ represent the power injected in the phases U, V and W respectively.

Considering, for example, a power $P_U$ to be injected in the phase U, with the powers $P_V$ and $P_W$ injected in the two other phases V and W being zero, then the following equation is obtained:

$$T_{C\_U}(s)=P_U(s)Z_{UU}(s)|_{P_V(s)=0;P_W(s)=0}+T_{SN}(s)=T_{C\_SN}(s)+T_{SN}(s) \quad (4)$$

in which $T_{SN}$ is the temperature measured by the sensor SN located at the centre of the heat sink.

The power injected in the phase U is a boxcar function having the amplitude $P_0$ at the time zero. Hence:

$$P_U(t) = P_0 \cdot h(t) \Rightarrow P_U(s) = \frac{P_0}{s} \quad (5)$$

The thermal self-impedance $Z_{UU}(s)$ then becomes:

$$Z_{UU}(s) = \frac{T_{C\_SN}(s)}{P_U(s)} = s\frac{L(T_{C\_SN}(t))}{P_0} = \sum_{k=1}^{M} \frac{R_{VUk}}{1+s\tau_{VUk}} \quad (6)$$

in which L is the Laplace transformation and $T_{C\_SN}$ is the case-sensor temperature defined based on the difference between the case temperature $T_{C\_U}$ and the temperature $T_{SN}$ measured by the sensor SN. In particular, the difference $T_{C\_SN}$ takes into account the various other heat sources located under the same sink 2 such as that represented by the input rectifier 3.

The same method can be applied for the phases V and W. The power is injected in each of the phases V or W, without there being supply in the other two phases, and the temperature response on the module M1 in the phase U is measured. This temperature response on the module M1 in the phase U, due to the horizontal transfer of heat coming from the modules in the phases V and W, represents the thermal transfer impedances $Z_{VU}$ and $Z_{WU}$.

$$Z_{VU}(s) = s\frac{L(T_{C\_SN}(t))}{P_0} \cong \sum_{k=1}^{M} \frac{R_{VUk}}{1+s\tau_{VUk}} \quad (7)$$

$$Z_{WU}(s) = s\frac{L(T_{C\_SN}(t))}{P_0} \cong \sum_{k=1}^{P} \frac{R_{WUk}}{1+s\tau_{WUk}}$$

Taking account of the equations (6) and (7) defined above and of the fact that the temperature response as a function of time can be put in the form of second order exponential series, the self-impedance $Z_{UU}$ and the transfer impedances $Z_{VU}$ and $Z_{WU}$ can be defined by:

$$Z_{UU}(s) \cong \frac{R_{UU1}}{1+s\tau_{UU1}} + \frac{R_{UU2}}{1+s\tau_{UU2}}, \quad (8)$$

$$Z_{VU}(s) \cong \frac{R_{VU1}}{1+s\tau_{VU1}} + \frac{R_{VU2}}{1+s\tau_{VU2}},$$

$$Z_{WU}(s) \cong \frac{R_{WU1}}{1+s\tau_{WU1}} + \frac{R_{WU2}}{1+s\tau_{WU2}}.$$

The thermal resistances $R_{UU1}$, $R_{UU2}$, $R_{VU1}$, $R_{VU2}$, $R_{WU1}$ and $R_{WU2}$ and the time constants $\tau_{UU1}$, $\tau_{UU2}$, $\tau_{VU1}$, $\tau_{VU2}$, $\tau_{WU1}$ and $\tau_{WU2}$ can be calculated using the appropriate algorithms.

The values of the parameters of the thermal model, such as the self-impedance $Z_{UU}$ and the transfer impedances $Z_{VU}$ and $Z_{WU}$, are therefore determined once and for all during the design of the speed controller thanks to a series of experiments. They are then used to manage the temperature of a module.

Figure 3A:
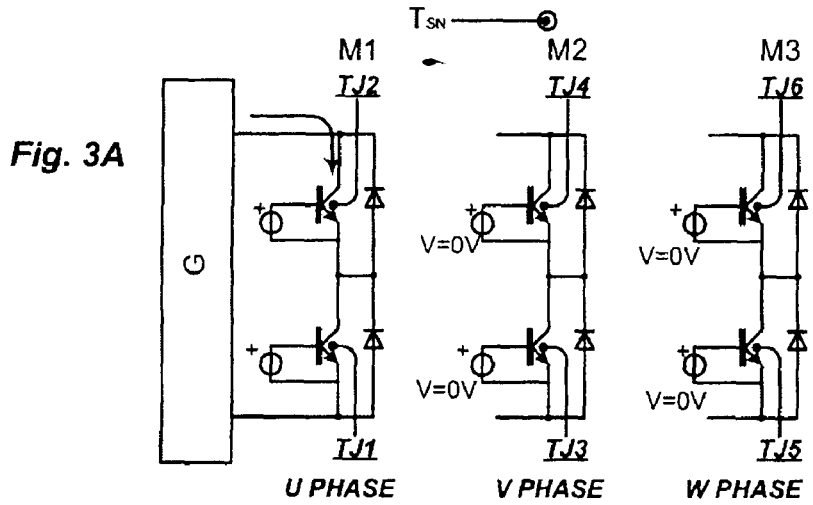
FIGS. 3A to 3C illustrate the procedures implemented to determine the temperature response of each of the transistors of the modules when power is injected in the phases U, V and W respectively.
Figure 3B:
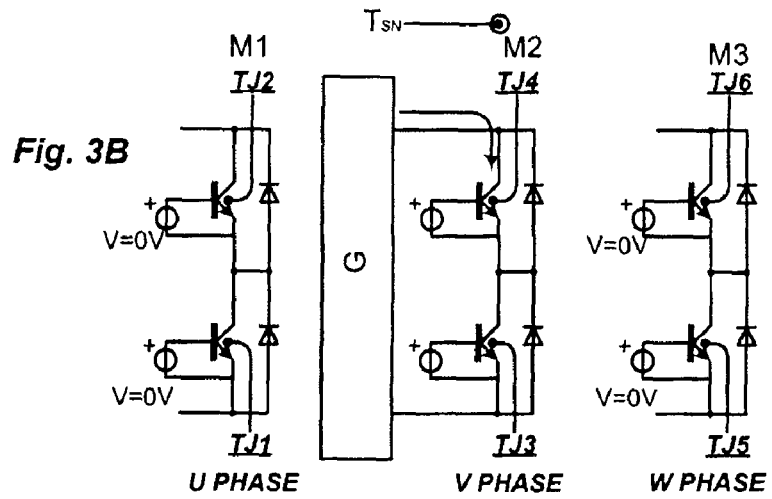
Figure 3C:
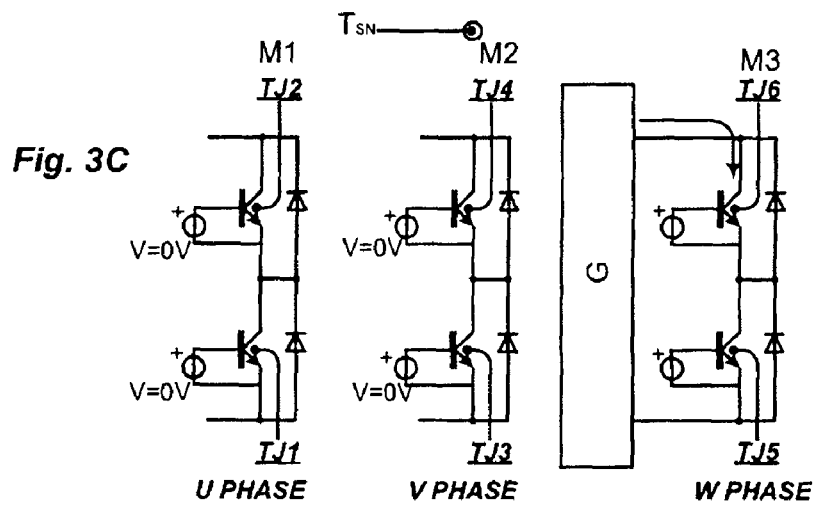

To calculate these values, a sensor for the junction temperature of the semiconductor components of the module M1 in the phase U is therefore used, a constant power is injected solely through the components of the module M1, and the junction temperatures Tj1 and Tj2 (FIG. 3A) are thus measured using said sensors. Based on these junction temperatures Tj1 and Tj2, the junction-case impedance defined by the specifications of the module and the power injected into the module, it is thus possible to determine the case temperature $T_{C\_U}$ of the module M1 in these conditions. By adding this case temperature $T_{C\_U}$ of the module M1 to a temperature $T_{SN}$ measured simultaneously by the sensor SN located on the sink 2, the case-sensor temperature $T_{C\_SN}$ is then obtained. Based on $T_{C\_SN}$, it is then possible to determine the self-impedance $Z_{UU}$, defined above, for the module M1. By injecting a constant power solely into the semiconductor components of the module M2 in the phase V (FIG. 3B) and by measuring the temperature response (Tj1 and Tj2) of this action on the module M1, the transfer impedance $Z_{VU}$ is determined. The same is done with the module M3 in the phase W in order to determine the transfer impedance $Z_{WU}$ (FIG. 3C). It is possible to proceed in the same way in order to calculate the self-impedances $Z_{VV}$ and $Z_{WW}$ of the modules M2 and M3 and the transfer impedances $Z_{UV}$, $Z_{WV}$ and $Z_{UW}$, $Z_{VW}$.

According to the invention, this thermal model, the values of which are stored in the controller 1, is then used to regulate the temperature of the module M1 in the phase U and thus to avoid its overheating or its deteriorating during normal operation of the controller.

To do this, the evolution of the case-sensor temperature $T_{C\_SN}$ is determined constantly or at regular intervals, this temperature corresponding to the temperature gradient between the module case and the heat sink 2 at the core of which a single sensor SN is located.

Figure 4:
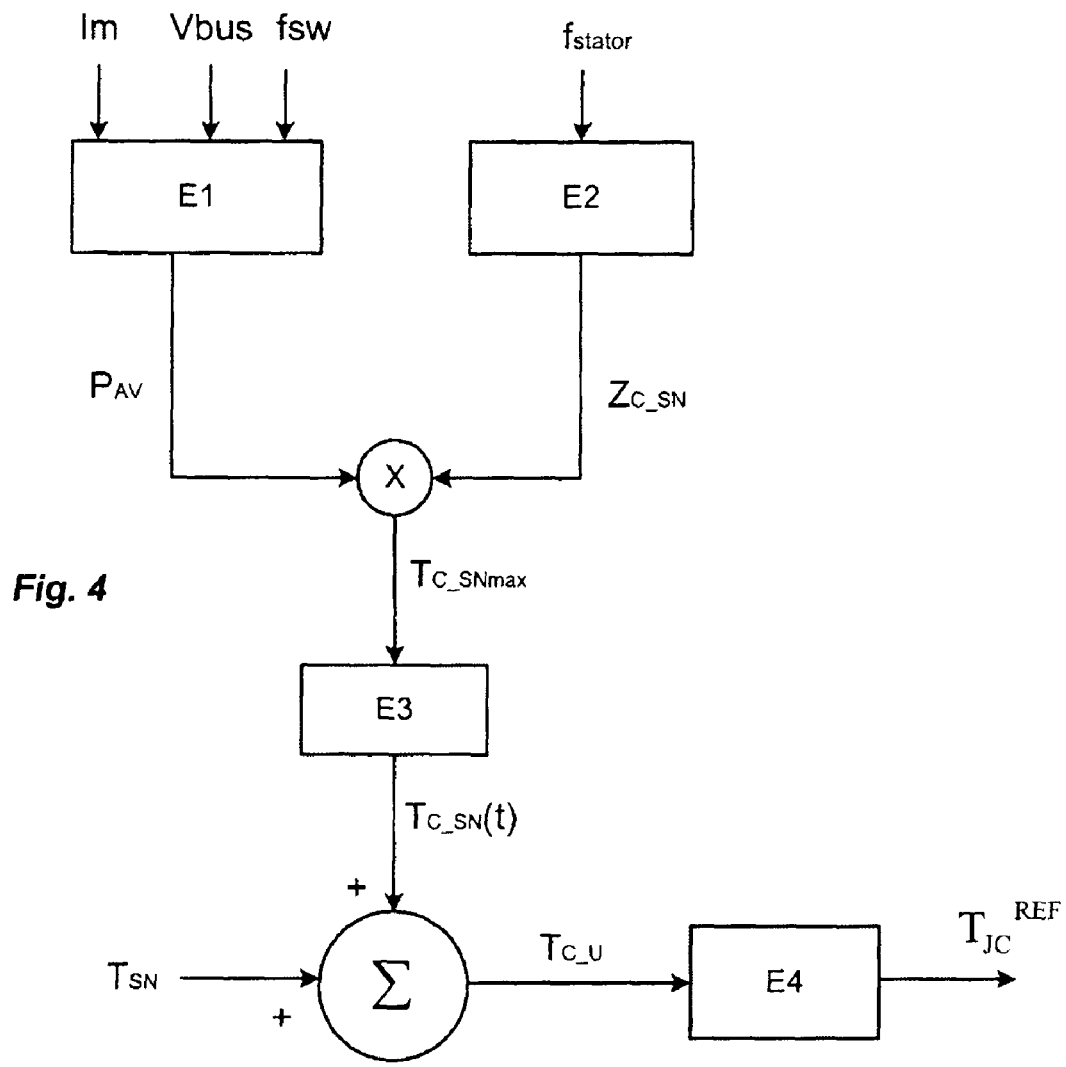
FIG. 4 represents the method of determining the reference junction-case temperature in the form of a block diagram.

The method implemented in the speed controller 1 (see FIG. 4) calculates the average power losses of the module M1 in the phase U (step E1, FIG. 4).

Starting with the principle that the motor currents are symmetrical and that the pulse modulation is sinusoidal, the motor current Im for the phase U and the modulation index m of the PWM (Pulse Width Modulation) command for the phase U are defined by the following equations:

$$I_U(t) = I_{PEAK}\sin(\omega_0 t - \varphi) \text{ et } m_U(t) = \frac{1}{2}(1 + M\sin(\omega_0 t)), \quad (9)$$

in which $I_{PEAK}$ is the maximum motor current $I_U$ calculated from measurements of the motor currents in the three phases, $\omega_0$ is the angular frequency of motor control (depending on the stator frequency of the motor) and $\phi$ is the phase shift of the motor current.

According to the approximations and the hypotheses, the expression for the average power losses of the module becomes:

$$P_{AV} \cong I_{PEAK}\left(\frac{1}{\pi}(V_{CE0} + V_{DF0}) + \frac{2(E_{ON} + E_{OFF} + E_{QN})}{\pi V_N I_N}V_{BUS}f_{SW} + I_{PEAK}\left(\frac{(r_{CE} + r_D)}{4}\right)\right). \quad (10)$$

in which:
- $V_{CE0}$, $V_{DF0}$, $r_{CE}$ and $r_D$ are the static parameters of a transistor IGBT and of the freewheeling diode FWD, such as its threshold voltage and its resistance;
- $V_{BUS}$ is the voltage measured at the DC bus of the speed controller;
- $f_{SW}$ is the switching frequency of the transistors IGBT of the module;
- $V_N$ and $I_N$ are the nominal voltage and the ampere rating of the motor; and
- $E_{ON}$, $E_{OFF}$ and $E_{QN}$ are the switching energies of the transistor IGBT, more precisely given in the specifications of the module at the nominal current $I_N$ and at the nominal voltage $V_N$.

The maximum of the case-sensor temperature in the stable state is treated on the basis of the thermal model defined above so as to obtain the following equation:

$$T_{C\_SN}|_{max} = P_{AV} \cdot Z_{C\_SN}(\omega_0) \quad (11)$$

The thermal impedance designated $Z_{C\_SN}(\omega_0)$ is also called the ringing effect impedance as it takes account of the ringing effect created by the heat sink 2. It also takes account of the thermal link between the base 10 of the module M1 and the sink 2. In particular, it is calculated based on the thermal model defined above and in FIG. 5 and based on the control angular frequency $\omega_0$. This impedance has a nonlinear function that it is difficult to implement in the control unit of the controller. Hence, this function is, for example, approximated by an exponential function.

Based on $Z_{C\_SN}(\omega_0)$, it is possible to calculate the temperature response corresponding to the gradient between the case of the module M1 and the heat sink 2. This response corresponds to the temperature generated by the ringing effect. It is calculated by passing the stable state response defined by equation (11) above through a generic filter representing the dynamics of the heat sink (step E3, FIG. 4). In this way, the case-sensor temperature $T_{C\_SN}$ is obtained.

According to the invention, it is then possible to determine the case temperature $T_{C\_U}$ of the module M1 in the phase U by adding the case-sensor temperature $T_{C\_SN}$ to the temperature $T_{SN}$ measured by the temperature sensor SN located on the sink 2.

According to the invention, the method for temperature management then allows a reference junction-case temperature $T_{JC}^{REF}$ (step 4, FIG. 4) to be determined. The real junction-case temperature is then regulated at this reference junction-case temperature $T_{JC}^{REF}$.

In order to determine the reference junction-case temperature, the method of the invention consists in taking account of the two known limiting values $T_{Jmax}$ and $T_{JCmax}$, specified for the junction temperature of a module and the junction-case temperature of the module respectively. To do this, the reference junction-case temperature is calculated based on the following equations:

$$T_{JC}^{REF}(t) = \begin{cases} T_{JC} = T_{Jmax} - T_{C\_SN}(t) - T_{SEN}(t) \dots \text{si} \dots T_{JC} < T_{JCmax} \\ T_{JCmax} \dots \text{si} \dots T_{JC} \geq T_{JCmax} \end{cases}$$

The reference junction-case temperature $T_{JC}^{REF}$ is therefore equal to a junction-case temperature $T_{JC} = T_{Jmax} - T_{C\_SN}(t) - T_{SEN}(t)$ if the temperature $T_{JC}$ determined is less than the predetermined limiting value $T_{JCmax}$ of the junction-case temperature, or equal to $T_{JCmax}$ if $T_{JC}$ is greater than or equal to $T_{JCmax}$.

Regulation of the real junction-case temperature at the reference junction-case temperature $T_{JC}^{REF}$ is carried out according to known methods. It may, for example, be carried out by limiting the output current of the controller.

It is understood that other variations and improvements in detail may be imagined, and even the use of equivalent means envisaged, without departing from the scope of the invention.

The invention claimed is:

1. A method for managing a temperature implemented in a speed controller, said speed controller including several modules, each comprising a case containing a power semiconductor designed to provide a pulsed voltage to an electrical load, each module being characterized by a junction temperature, a heat sink to dissipate heat generated by each module, and a temperature sensor mounted on the heat sink, said method for a module comprising:
   estimating a case temperature of the module based on a predetermined thermal model of the sink, a temperature measured by the sensor and average power losses that the module undergoes, said predetermined thermal model of the sink integrating thermal transfer impedances representing a thermal influence of one module on another and vice versa;
   determining a junction-case temperature based on the case temperature of the module and a limiting value of the junction temperature; and limiting the junction-case temperature obtained to a predetermined limiting value of the junction-case temperature.

2. The method according to claim 1, wherein the thermal model of the sink is defined by the following equation:

$$\begin{bmatrix} T_{C\_U}(s) \\ T_{C\_V}(s) \\ T_{C\_W}(s) \end{bmatrix} = \underbrace{\begin{bmatrix} Z_{UU}(s) & Z_{VU}(s) & Z_{WU}(s) \\ Z_{UV}(s) & Z_{VV}(s) & Z_{WV}(s) \\ Z_{UW}(s) & Z_{VW}(s) & Z_{WW}(s) \end{bmatrix}}_{Z_{jk}(s)} \cdot \begin{bmatrix} P_U(s) \\ P_V(s) \\ P_W(s) \end{bmatrix} + \begin{bmatrix} 1 \\ 1 \\ 1 \end{bmatrix} \cdot T_{SN}$$

in which:

$T_{C\_U}$, $T_{C\_V}$ and $T_{C\_W}$ represent the case temperatures of each module placed at the phases U, V and W respectively;

$Z_{UU}$, $Z_{VV}$ and $Z_{WW}$ correspond to an increase in temperature due to a ringing effect and to a non-ideal thermal contact existing between the module case and the heat sink;

$Z_{VU}$, $Z_{WU}$, $Z_{UV}$, $Z_{WV}$, $Z_{UW}$ and $Z_{VW}$ are the thermal transfer impedances representing the thermal influence of one module on another and vice versa; and $T_{SN}$ is the temperature measured by the temperature sensor.

3. The method according to claim 2, wherein variables of the thermal model are determined in advance by independently injecting power in each of the phases and by measuring an effect on temperature produced on the module in each phase.

4. The method according to one of claims 1 to 2, wherein the method further comprises limiting the junction-case temperature obtained to a predetermined limiting value of the junction-case temperature while taking account of the module positioned in the controller in a thermally least advantageous situation.

5. The method according to one of claims 1 to 2, wherein the case temperature of the module is estimated based on an angular frequency of control applied to the load.

6. The method according to one of claims 1 to 2, wherein the average power losses are calculated based on a load current, a switching frequency of transistors in the module, a voltage measured on a DC bus of the controller and parameters specific to the module.

7. A system for managing the temperature in a speed controller comprising several semiconductor power modules able to provide a pulsed voltage to an electrical load connected to the controller, said system comprising processing means connected with a memory and means for controlling the modules of the controller in order to regulate the temperature, wherein the system is configured to implement the method defined in one of claims 1 to 2.

* * * * *